(12) United States Patent
Yi et al.

(10) Patent No.: US 12,528,730 B2
(45) Date of Patent: Jan. 20, 2026

(54) METHOD FOR ABLATING COATING FILM, CUTTING GLASS, AND PERFORMING POST-TREATMENT BY USING LASER

(71) Applicant: DOWOOINSYS CO.,LTD., Cheongju-si (KR)

(72) Inventors: Seung Jun Yi, Suwon-si (KR); Hyung Sup Lee, Yongin-si (KR); Sun Hong Choi, Yongin-si (KR); Bon Ki Koo, Boeun-gun (KR)

(73) Assignee: DOWOOINSYS CO., LTD., Cheongju-si (KR)

( * ) Notice: Subject to any disclaimer, the term of this patent is extended or adjusted under 35 U.S.C. 154(b) by 180 days.

(21) Appl. No.: 18/575,253

(22) PCT Filed: Nov. 1, 2021

(86) PCT No.: PCT/KR2021/015537
§ 371 (c)(1),
(2) Date: Dec. 28, 2023

(87) PCT Pub. No.: WO2023/068420
PCT Pub. Date: Apr. 27, 2023

(65) Prior Publication Data
US 2024/0317629 A1   Sep. 26, 2024

(30) Foreign Application Priority Data
Oct. 20, 2021 (KR) .......... 10-2021-0139991

(51) Int. Cl.
C03B 33/08 (2006.01)
C03B 33/07 (2006.01)
(Continued)

(52) U.S. Cl.
CPC .......... C03B 33/082 (2013.01); C03B 33/074 (2013.01); C03C 15/02 (2013.01); C03C 17/32 (2013.01)

(58) Field of Classification Search
CPC .......................... C03C 15/00; C03C 23/0025
See application file for complete search history.

(56) References Cited

U.S. PATENT DOCUMENTS

| 5,622,540 A * | 4/1997 | Stevens ................. C03B 33/091 219/121.6 |
| 2008/0210660 A1 * | 9/2008 | Stockum ............... H10F 71/138 216/101 |
| 2009/0013724 A1 * | 1/2009 | Koyo ................. B23K 26/0093 65/31 |

(Continued)

FOREIGN PATENT DOCUMENTS

| CN | 103693855 A * | 4/2014 | ........... C03B 33/023 |
| CN | 110194596 A * | 9/2019 | ............. C03C 17/42 |

(Continued)

OTHER PUBLICATIONS

International Search Report of PCT/KR2021/015537, Jan. 25, 2023, English translation.

*Primary Examiner* — Erin Snelting
*Assistant Examiner* — Steven S Lee
(74) *Attorney, Agent, or Firm* — STIP Law Group, LLC

(57) ABSTRACT

A method for ablating a coating film, cutting glass, and performing post-treatment by using a laser according to the present invention includes coating one side or both sides of thin mother glass with a coating solution for preventing chemical contact in order to proceed with selective chemical treatment, drying the coating solution to form a coating film on one side or both sides of the thin mother glass, obtaining thin-film glasses in cell units applied to electrical and electronic products from the thin mother glass, healing a laser-cut surface of the cut thin-film glasses in cell units through selective chemical treatment of the cut thin-film (Continued)

glasses in cell units, cleaning the thin-film glasses in cell units, and then ablating all of a coating film formed on a surface of the thin-film glasses in cell units, and cleaning the thin-film glasses in cell units from which all of the coating film has been ablated and then chemically healing the surface of the thin-film glasses in cell units in order to eliminate defects or flaws on the surface of the thin-film glasses in cell units from which all of the coating film has been ablated.

1 Claim, 4 Drawing Sheets

(51) Int. Cl.
*C03C 15/02* (2006.01)
*C03C 17/32* (2006.01)

(56) References Cited

U.S. PATENT DOCUMENTS

| | | | |
|---|---|---|---|
| 2013/0155004 A1* | 6/2013 | Yoshikawa | C03C 17/002 345/174 |
| 2017/0008793 A1* | 1/2017 | Bankaitis | C03B 33/091 |
| 2017/0066679 A1* | 3/2017 | Yeh | C03B 33/078 |
| 2020/0353567 A1* | 11/2020 | Matsuo | C03B 33/09 |
| 2020/0399158 A1* | 12/2020 | Alderman | C03B 18/12 |

FOREIGN PATENT DOCUMENTS

| | | | | |
|---|---|---|---|---|
| KR | 100368732 B1 | | 4/2003 | |
| KR | 20100026394 A | | 3/2010 | |
| KR | 20130056124 A | | 5/2013 | |
| KR | 20130101763 A | * | 9/2013 | B24B 9/10 |
| KR | 101684344 B1 | | 12/2016 | |
| KR | 2017514774 A | | 6/2017 | |
| KR | 102222715 B1 | | 3/2021 | |
| WO | WO-2019138990 A1 | * | 7/2019 | B23K 26/53 |

* cited by examiner

METHOD FOR ABLATING COATING FILM, CUTTING GLASS, AND PERFORMING POST-TREATMENT BY USING LASER

CROSS-REFERENCE TO RELATED APPLICATIONS

This application is the U.S. National Phase under 35 U.S.C. § 371 of International Application No. PCT/KR2021/015537, filed on Nov. 1, 2021, which in turn claims the benefit of Korean Application No. 10-2021-0139991, filed on Oct. 20, 2021, the disclosures of which are incorporated by reference into the present application.

TECHNICAL FIELD

The present disclosure herein relates to a method for ablating a coating film, cutting glass, and performing post-treatment by using a laser, and more particularly, to a method for ablating a coating film, cutting glass, and performing post-treatment by using a laser, wherein a coated thin mother glass is cut into cell units by using a laser, cut surfaces of thin-film glasses in cell units are healed, the coating film is ablated, and then surfaces of the thin-film glasses in cell units are smoothly healed to manufacture thin-film glasses in cell units applied to various electrical and electronic products.

BACKGROUND ART

Recently, due to the slimming of electronic products such as smart phones, common glass or an acrylic plate typically used is being replaced by thin-film glass.

The thin-film glass is used as a display window for portable electronic products such as mobile phones, PMPs, and MP3 players, and the thinner the thin-film glass, the better it is in terms of design and portability.

In order to manufacture thin-film glasses in cell units applied to various electronic products, thin mother glass is cut to a certain size.

At this time, fine cracks or fine chippings generated during the cutting cause degradation in strength of the cut thin-film glasses in cell units, and in order to minimize the degradation, face-milling and chamfering processes are additionally performed.

However, in such processes, there is a risk of damage during the face-milling and chamfering processes since the thin mother glass is very thin, and there is a problem in that individually face-milling and chamfering the thin-film glasses in cell units applied to a product result in a significant loss in labor and time.

In order to solve the above-described problem, a method for bonding and laminating thin mother glass and then processing the laminated thin mother glass into a single body has been proposed.

The method for bonding and laminating thin mother glass and then processing the laminated thin mother glass into a single body includes a first embodiment of performing processing by using a CNC, and a second embodiment of performing processing by using a laser beam, and a detailed description of the first embodiment is as follows.

First, the first embodiment broadly includes the steps of laminating two or more thin mother glass and applying a resin for maintaining a height gap between the two or more thin mother glass according to a preset pattern, cutting the two or more laminated thin mother glass by using a CNC processing method, thereby obtaining thin-film glasses in cell units applied to various electrical and electronic products from the thin mother glass, chemically healing several laminated sheets of thin-film glasses in cell units to smooth cut surfaces of the thin-film glasses in cell units, cleaning the healed thin-film glasses in cell units, completely curing resins applied between the thin-film glasses in cell units to make it easy to peel off the resins from the thin-film glasses in cell units, peeling off the resins adhered between the thin-film glasses in cell units from the thin-film glasses in cell units, cleaning the thin-film glasses in cell units from which the resins have been eliminated, chemically healing the cleaned thin-film glasses in cell units, and cleaning the chemically-healed thin-film glasses in cell units, reinforcing the cleaned thin-film glasses in cell units, and then subjecting the same to a subsequent process.

The step of laminating two or more thin mother glass and applying a resin for maintaining a height gap between the two or more thin mother glass according to a preset pattern includes a 1-1 step of applying a resin on an upper surface of thin mother glass, a 1-2 step of laminating thin mother glass on the applied resin and then thinly spreading the resin, a 1-3 step of UV-curing the thinly-spread resin, and repeating the 1-1 step to the 1-3 step to laminate two or more thin mother glass.

However, due to the process of laminating two or more thin mother glass by using a resin, the CNC cutting process including roughing, semi-finishing, and finishing processes to cut the laminated thin mother glass into thin-film glasses in cell units, the process of chemically healing laminated thin-film glasses in cell units to smooth cut surfaces of the thin-film glasses in cell units, the process of completely curing resins to make it easy to separate the laminated thin-film glasses in cell units, the process of cleaning the thin-film glasses in cell units after peeling off the resins, and the process of chemically healing and then cleaning the thin-film glasses in cell units, the first embodiment not only requires a significant amount of time to manufacture thin-film glasses in cell units, but also has a problem in that manufacturing costs of the cell-level thin-film glass increases.

Next, a detailed description of the second embodiment is as follows.

The second embodiment of performing processing by using a laser beam broadly includes a step of irradiating a laser beam along a cutting line of thin mother glass to cut the thin mother glass, thereby obtaining thin-film glasses in cell units from the thin mother glass, a second step of laminating two or more cut thin-film glasses in cell units while applying a resin for a height interval between vertically disposed thin-film glasses in cell units, a third step of chemically healing the two or more laminated thin-film glasses in cell units to smooth cut surfaces of the cut thin-film glasses in cell units, a fourth step of cleaning the laminated thin-film glasses in cell units, a fifth step of completely curing the resins applied between the thin-film glasses in cell units to make it easy to peel off the resins from the several laminated thin-film glasses in cell units, a sixth step of peeling off the resins adhered to the thin-film glasses in cell units and cleaning the individually separated thin-film glasses in cell units, a seventh step of chemically healing the cleaned thin-film glasses in cell units, and cleaning and then reinforcing the chemically-healed thin-film glasses in cell units, and then subjecting the same to a subsequent process.

In addition, the second step of laminating two or more cut thin-film glasses in cell units while applying a resin for a height interval between vertically disposed thin-film glasses in cell units includes a 2-1 step of laminating two or more cut thin-film glasses in cell units while applying a resin for a height interval between a pair of vertically disposed thin-film glasses in cell units, a 2-2 step of laminating thin-film glasses in cell units on the applied resin and then thinly spreading the resin, a 2-3 step of UV-curing the evenly-spread resin, and repeating the 2-1 step to the 2-3 step to laminate two or more cut thin-film glasses in cell units.

However, due to the process of laminating two or more cut thin-film glasses in cell units by using a resin, the process of completely curing the resins applied between the laminated thin-film glasses in cell units, and the process of peeling off the resins and separating the laminated thin-film glasses in cell units, the method of using a laser beam not only requires a significant amount of time to manufacture thin-film glasses in cell units, but also has a problem in which manufacturing costs of the thin-film glasses in cell units increases.

In addition, in the case of a method for cutting glass by using a CNC, defects such as fine cracks or fine chippings are generated on a cut surface, and in the case of a method for cutting glass and ablating a coating film by using a laser, there is a problem in that thin-film glasses in cell units is easily broken due to thermal damage generated in a portion irradiated with the laser.

Such fine cracks or fine chipping defects caused by a CNC or thermal damage caused by a laser may cause degradation in flexural strength even after thin-film glasses in cell units is reinforced.

As a method mainly used to compensate for a weakened portion of a CNC or laser cut surface, as in the first embodiment and in the second embodiment, there is a method for laminating thin-film glasses in cell units in several layers by using a resin, and then performing chemical treatment on a cut surface to heal defects or thermally-damaged portion generated when cutting glass.

However, the method for treating a cut surface also has limitations, so that it is necessary to secure a method capable of minimizing damage to thin-film glass when cutting the thin-film glass by using a CNC process or a laser process, whereas if such a method is secured, there is a problem in that a process margin becomes small and processing time of thin-film glasses in cell units applied to various electrical and electronic products is long, and if a surface-treatment process is additionally performed, a process for manufacturing thin-film glasses in cell units becomes very complicated, which may cause an increase in costs when manufacturing a product.

Meanwhile, as the prior art of the present invention, "Efficient processing method of thin-plate glass" under application number "10-2010-0026394" has been applied for and disclosed, wherein the efficient processing method of thin-plate glass includes a process of applying a bonding material between laminated glass mother-plates to bond the glass mother-plates to each other, and collectively cutting the bonded glass mother-plates into block units, a process of face-milling thin-plate materials of block units, and a process of polishing a cut cross-section by using a rotational force of a brush and an abrasive.

However, the efficient processing method of thin-plate glass has a problem in that fine cracks or fine chipping defects on the cut cross-section of the thin-plate glass are not completely eliminated due to the face-milling process and the polishing process.

DISCLOSURE OF THE INVENTION

Technical Problem

The present disclosure provides a method for ablating a coating film, cutting glass, and performing post-treatment using a laser, the method capable of reducing manufacturing costs when a glass cutting process and a post-processing process are performed in the manufacture of thin-film glasses in cell units (UTG: Ultra-Thin Glass) applied to various electrical and electronic products.

The present disclosure also provides a method for ablating a coating film, cutting glass, and performing post-treatment using a laser, the method capable of reducing manufacturing costs of thin-film glasses in cell units by simplifying a manufacturing process in the manufacture of the thin-film glasses in cell units.

The present disclosure also provides a method for ablating a coating film, cutting glass, and performing post-treatment using a laser, the method capable of improving durability of processed thin-film glasses in cell units by eliminating, through selective chemical treatment, a thermally damaged area around a glass cutting surface caused by a laser beam during the glass cutting and the coating film ablation by using a laser.

Technical Solution

In accordance with an exemplary embodiment of the present invention, a method for ablating a coating film, cutting glass, and performing post-treatment by using a laser includes (S1) coating one side or both sides of thin mother glass 1 with a coating solution for preventing chemical contact to proceed with selective chemical treatment, (S2) drying the coating solution to form a coating film 2 on one side or both sides of the thin mother glass 1, (S3) irradiating the coating film formed on either side of the thin mother glass 1 with a laser beam along a line to be cut of the thin mother glass 1 to partially ablate the coating film, and irradiating a surface of the thin mother glass 1 exposed to the outside through a coating film ablation portion A, from which the coating film 2 has been ablated, with a laser beam to cut the thin mother glass 1, thereby obtaining thin-film glasses in cell units 5 applied to electrical and electronic products from the thin mother glass 1, (S4) healing a laser-cut surface of the thin-film glasses in cell units 5 through selective chemical treatment of the cut thin-film glasses in cell units 5 in order to eliminate a thermally-damaged area and a defective area generated during the laser cutting process around a cut surface of the thin-film glasses in cell units 5, (S5) ablating all of a coating film 2 formed on a surface of the thin-film glasses in cell units 5, and (S6) chemically healing the surface of the thin-film glasses in cell units 5 from which all of the coating film 2 has been ablated in order to eliminate defects or flaws on the surface of the thin-film glasses in cell units 5 from which all of the coating film 2 has been ablated. The step (S3) of irradiating the coating film formed on either side of the thin mother glass 1 with a laser beam along a line to be cut of the thin mother glass 1 to partially ablate the coating film, and irradiating a surface of the thin mother glass 1 exposed to the outside through a coating film ablation portion A, from which the coating film 2 has been ablated, with a laser beam to cut the thin mother glass 1, thereby obtaining thin-film glasses in cell units 5 applied to electrical and electronic products from the thin mother glass 1 includes, when the coating film 2 is formed only on one side of the thin mother glass 1, irradiating a surface of the coating film 2 along a line to be cut of the thin mother glass 1 with a laser beam output from an ultraviolet laser 4 generating a wavelength of 400 nm or less to ablate the coating film 2 along the line to be cut of the thin mother glass 1, and irradiating the thin mother glass 1 exposed to the outside through a coating film ablation portion A, from which the coating film 2 has been ablated, with a laser beam output from an infrared laser 3 generating a wavelength of 1000 nm or greater to cut the thin mother glass 1. In addition, the step (S3) of irradiating the coating film formed on either side of the thin mother glass 1 with a laser beam along a line to be cut of the thin mother glass 1 to partially ablate the coating film, and irradiating a surface of the thin mother glass 1 exposed to the outside through a coating film ablation portion A, from which the coating film 2 has been ablated, with a laser beam to cut the thin mother glass 1, thereby obtaining thin-film glasses in cell units 5 applied to electrical and electronic products from the thin mother glass 1 includes, when the coating film 2 is formed on both sides of the thin mother glass 1, irradiating a surface of the coating film 2, which is formed on one side of the thin mother glass 1, along a line to be cut of the thin mother glass 1 with a laser beam output from an ultraviolet laser 4 generating a wavelength of 400 nm or less to ablate a pair of the coating films 2 facing each other in a thickness direction of the thin mother glass 1 along the line to be cut of the thin mother glass 1, and irradiating the thin mother glass 1 exposed to the outside through a coating film ablation portion A, from which the coating film 2 has been ablated, with a laser beam output from an infrared laser 3 generating a wavelength of 1000 nm or greater to cut the thin mother glass 1. A nanosecond infrared laser 3, a picosecond infrared laser 3, or a femtosecond infrared laser 3 is used as the infrared laser 3, and the infrared laser 3 outputs a Bessel beam. A nanosecond ultraviolet laser 4, a picosecond ultraviolet laser 4, or a femtosecond ultraviolet laser 4 is used as the ultraviolet laser 4. In the step (S4) of healing a laser-cut surface of the thin-film glasses in cell units 5 through selective chemical treatment of the cut thin-film glasses in cell units 5 in order to eliminate a thermally-damaged area and a defective area generated during the laser cutting process around a cut surface of the thin-film glasses in cell units 5, in a right-angled corner portion of the thin-film glasses in cell units 5 facing the coating film 2, a bevel-shaped cut portion 11 is formed through selective chemical treatment, wherein the bevel-shaped cut portion 11 has a horizontal width of approximately 3 um to approximately 500 um, the bevel-shaped cut portion 11 has a height of approximately 3 um or greater, and the bevel-shaped cut portion 11 has a thickness of no greater than approximately 50% of the thickness of the thin-film glasses in cell units 5.

Advantageous Effects

The method for ablating a coating film, cutting glass, and performing post-treatment by using a laser according to the present invention, the method composed of the above-described processes, may reduce manufacturing time and costs of thin-film glasses in cell units by simplifying a manufacturing process in the manufacture of the thin-film glasses in cell units mounted on various electrical and electronic products.

In addition, the present invention improves durability of processed thin-film glasses in cell units by eliminating, through selective chemical treatment, a thermally-damaged area around a glass cutting surface caused by a laser beam when cutting glass and a coating film by using a laser, and increases manufacturing efficiency through reducing defects.

Figure 1:
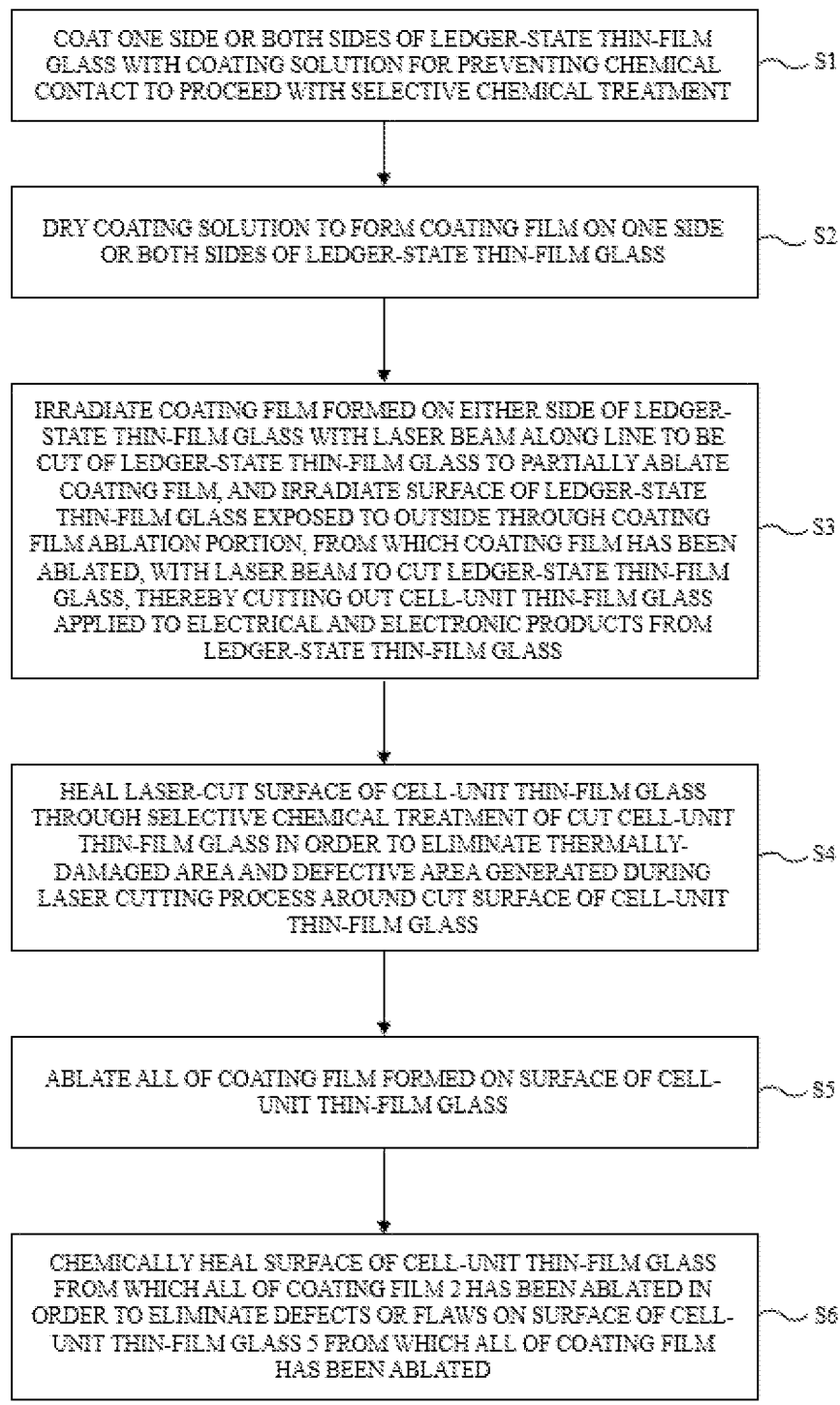
FIG. 1 is a process flowchart in accordance with an exemplary embodiment of the present invention.

| *Description of the Reference Numerals or Symbols* | |
|---|---|
| 1. Thin mother glass | 11. Oblique cut-out portion |
| 2. Coating film | 3. Infrared laser |
| 4. Ultraviolet laser | 5. Thin-film glasses in cell units |

MODE FOR CARRYING OUT THE INVENTION

Hereinafter, the present invention will be described in detail with reference to the accompanying drawings.

A method for ablating a coating film, cutting glass, and performing post-treatment by using a laser according to the present invention includes, as illustrated in FIG. 1, (S1) coating one side or both sides of thin mother glass 1 with a coating solution for preventing chemical contact to proceed with selective chemical treatment, (S2) drying the coating solution to form a coating film 2 on one side or both sides of the thin mother glass 1, (S3) irradiating the coating film formed on either side of the thin mother glass 1 with a laser beam along a line to be cut of the thin mother glass 1 to partially ablate the coating film, and irradiating a surface of the thin mother glass 1 exposed to the outside through a coating film ablation portion A, from which the coating film 2 has been ablated, with a laser beam to cut the thin mother glass 1, thereby obtaining thin-film glasses in cell units 5 applied to electrical and electronic products from the thin mother glass 1, (S4) healing a laser-cut surface of the thin-film glasses in cell units 5 through selective chemical treatment of the cut thin-film glasses in cell units 5 in order to eliminate a thermally-damaged area and a defective area generated during the laser cutting process around a cut surface of the thin-film glasses in cell units 5, (S5) ablating all of a coating film 2 formed on a surface of the thin-film glasses in cell units 5, and (S6) chemically healing the surface of the thin-film glasses in cell units 5 from which all of the coating film 2 has been ablated in order to eliminate defects or flaws on the surface of the thin-film glasses in cell units 5 from which all of the coating film 2 has been ablated.

The thin mother glass 1 and the thin-film glasses in cell units 5 have a thickness of approximately 100 um or less.

The coating film formed on either side of the thin mother glass 1 has a thickness of approximately 1 um to approximately 30 um.

A sodium alumino-silicate-based glass is used as the thin mother glass 1.

In addition, as illustrated in FIG. 1, the present invention further includes a step of reinforcing the surface-healed thin-film glasses in cell units 5.

Figure 2:
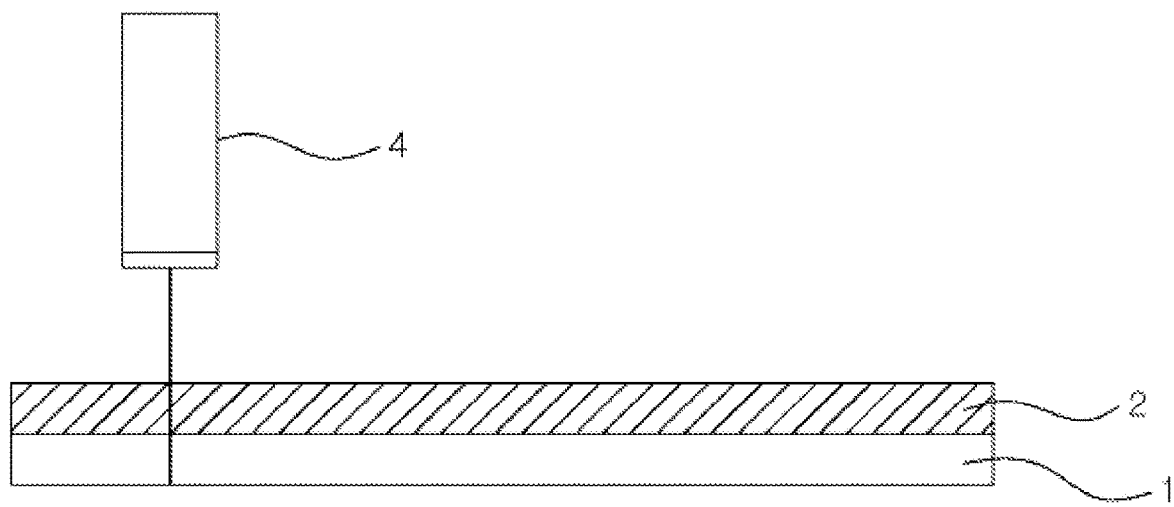
FIG. 2 shows an embodiment in which, when a coating film is formed only on one side of the thin mother glass, the coating film is first ablated along a line to be cut of the thin mother glass by using a laser beam output from an ultraviolet laser, and the thin mother glass is cut by being irradiated with a laser beam output from an infrared laser through an ablation portion formed on the coating film in accordance with another exemplary embodiment.
Figure 2:
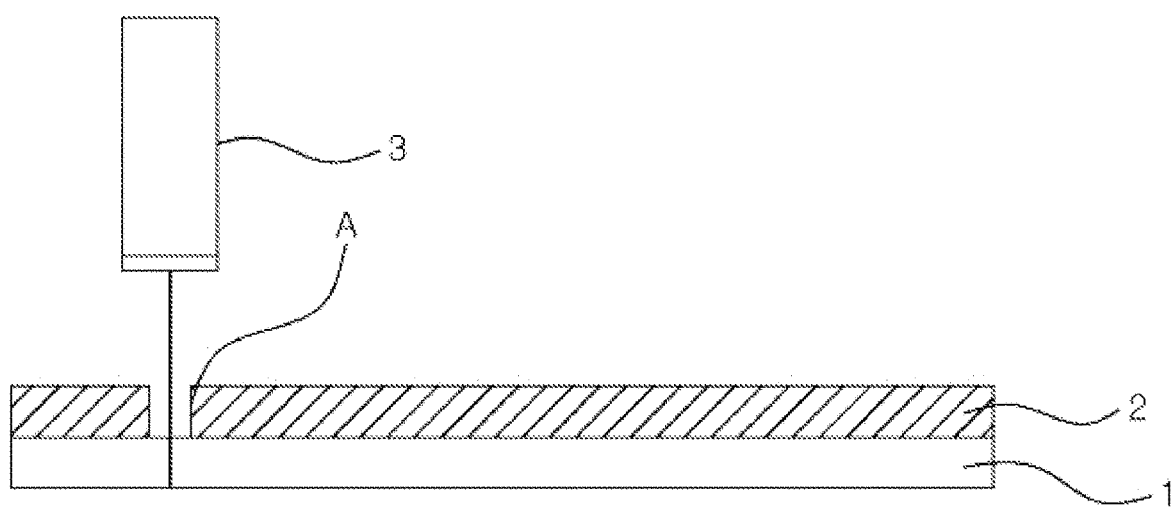

The step (S3) of irradiating the coating film formed on either side of the thin mother glass 1 with a laser beam along a line to be cut of the thin mother glass 1 to partially ablate the coating film, and irradiating a surface of the thin mother glass 1 exposed to the outside through a coating film ablation portion A, from which the coating film 2 has been ablated, with a laser beam to cut the thin mother glass 1, thereby obtaining thin-film glasses in cell units 5 applied to electrical and electronic products from the thin mother glass 1 includes as illustrated in FIG. 2, when the coating film 2 is formed only on one side of the thin mother glass 1, irradiating a surface of the coating film 2 along a line to be cut of the thin mother glass 1 with a laser beam output from an ultraviolet laser 4 generating a wavelength of 400 nm or less to ablate the coating film 2 along the line to be cut of the thin mother glass 1, and irradiating the thin mother glass 1 exposed to the outside through a coating film ablation portion A, from which the coating film 2 has been ablated, with a laser beam output from an infrared laser 3 generating a wavelength of 1000 nm or greater to cut the thin mother glass 1.

Figure 3:
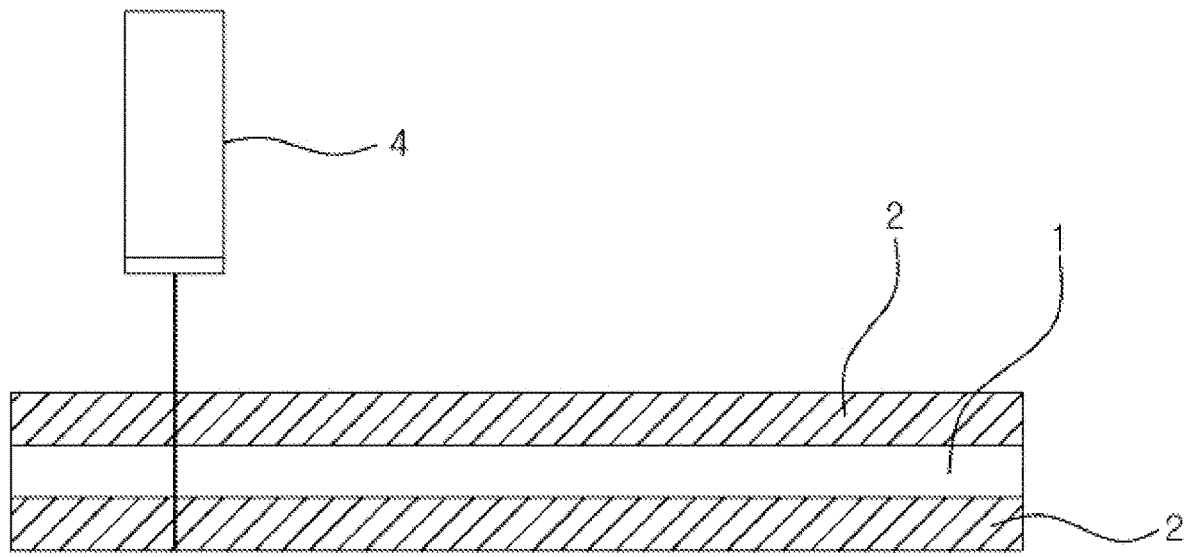
FIG. 3 shows an embodiment in which, when a coating film is formed on both sides of the thin mother glass, the coating film bonded to both sides of the thin mother glass is first ablated along a line to be cut of the thin mother glass by using a laser beam output from an ultraviolet laser, and the thin mother glass is cut by being irradiated with a laser beam output from an infrared laser through an ablation portion formed on the coating film in accordance with still another exemplary embodiment.
Figure 3:
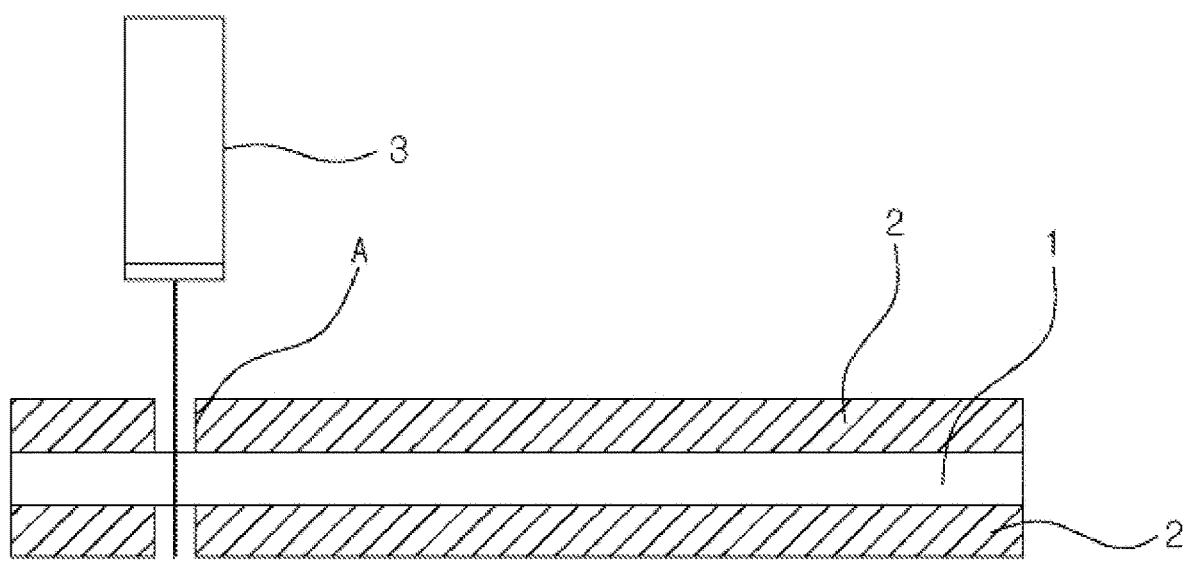

The step (S3) of irradiating the coating film formed on either side of the thin mother glass 1 with a laser beam along a line to be cut of the thin mother glass 1 to partially ablate the coating film, and irradiating a surface of the thin mother glass 1 exposed to the outside through a coating film ablation portion A, from which the coating film 2 has been ablated, with a laser beam to cut the thin mother glass 1, thereby obtaining thin-film glasses in cell units 5 applied to electrical and electronic products from the thin mother glass 1 includes, when the coating film 2 is formed on both sides of the thin mother glass 1, as illustrated in FIG. 3. irradiating a surface of the coating film 2, which is formed on one side of the thin mother glass 1, along a line to be cut of the thin mother glass 1 with a laser beam output from an ultraviolet laser 4 generating a wavelength of 400 nm or less to ablate a pair of the coating films 2 facing each other in a thickness direction of the thin mother glass 1 along the line to be cut of the thin mother glass 1, and irradiating the thin mother glass 1 exposed to the outside through a coating film ablation portion A, from which the coating film 2 has been ablated, with a laser beam output from an infrared laser 3 generating a wavelength of 1000 nm or greater to cut the thin mother glass 1.

Here, when the coating film 2 is formed on both sides of the thin mother glass 1, if the coating film 2 formed on either side of the thin mother glass 1 is irradiated with an ultraviolet laser beam, the ultraviolet laser beam transmits a pair of sequentially laminated coating films 2 and thin mother glass 1 sandwiched between the pair of coating films 2, and all of the coating films 2 formed on both sides of the thin mother glass 1 are ablated by the ultraviolet laser beam.

A nanosecond infrared laser 3, a picosecond infrared laser 3, or a femtosecond infrared laser 3 is used as the infrared laser 3, and the infrared laser 3 outputs a Bessel beam.

A nanosecond ultraviolet laser 4, a picosecond ultraviolet laser 4, or a femtosecond ultraviolet laser 4 is used as the ultraviolet laser 4.

The infrared laser 3 which outputs a Bessel beam has a laser beam wavelength of approximately 1020 nm to approximately 1040 nm, and has a laser beam size of approximately 0.8 um to approximately 1.8 um, and the pulse duration of a laser beam is approximately 3 ps to approximately 12 ps.

In addition, the pulse repetition rate of the laser beam is approximately 190 khz to approximately 210 khz, and the pulse energy thereof is approximately 3 uJ to approximately 42 uJ.

In the step (S3) of irradiating the coating film formed on either side of the thin mother glass 1 with a laser beam along a line to be cut of the thin mother glass 1 to partially ablate the coating film, and irradiating a surface of the thin mother glass 1 exposed to the outside through a coating film ablation portion A, from which the coating film 2 has been ablated, with a laser beam to cut the thin mother glass 1, thereby obtaining thin-film glasses in cell units 5 applied to electrical and electronic products from the thin mother glass 1, the ultraviolet laser 4 may be used as a laser for ablating the coating film 2, and the infrared laser 3 may be used as a laser for cutting the thin mother glass 1, wherein the infrared laser 3 may output a Bessel beam, and the ultraviolet laser 4 may be equipped with a scanner capable of increasing the efficiency of cutting the coating film 2 by freely adjusting the position of a laser beam focused on the coating film 2.

When a femtosecond ultraviolet laser scanner is used as the scanner, the laser beam wavelength of the femtosecond ultraviolet laser 4 is approximately 250 nm to approximately 360 nm, and the size of a laser beam output from the femtosecond ultraviolet laser scanner is approximately 5 um to approximately 50 um, and the overlap rate of a laser beam spot output from the femtosecond ultraviolet laser scanner is approximately 10% to approximately 99%.

In addition, the moving speed of the femtosecond ultraviolet laser 4 is approximately 500 mm/s to approximately 5000 mm/s, and the pulse repetition rate of a laser beam output from the femtosecond ultraviolet laser 4 is approximately 400 KHz or approximately 800 kHz.

The coating solution should be an acrylic solution, or a solution having an ultraviolet absorption rate of approximately 10% or greater in an ultraviolet wavelength range of approximately 400 nm or less, among a polyethylene resin, a polypropylene resin, a polyvinyl chloride resin, and a polystyrene resin, and a solution having an infrared absorption rate of approximately 1% or less in an infrared wavelength range of approximately 1000 nm or greater is used.

In the step (S1) of coating one side or both sides of thin mother glass 1 with a coating solution for preventing chemical contact to proceed with selective chemical treatment, when coating one side of the thin mother glass 1 with a coating solution, a slot die coating method, a spray coating method, an inkjet coating method, a bar coding method, or a screen printing method may be used, and in the case of coating both sides thereof, a spray coating method, a dip coating method, or the like is used.

In the step (S1) of coating one side or both sides of thin mother glass 1 with a coating solution for preventing chemical contact to proceed with selective chemical treatment, when coating both sides of the thin mother glass 1 with a coating solution, a spray coating method may be used, or a method for coating both sides thereof by impregnating the thin mother glass 1 in a coating solution, or a method for coating one side of the thin mother glass 1 and then inverting the thin mother glass 1 to coat the other side thereof is used.

In the step (S2) of drying the coating solution to form a coating film 2 on one side or both sides of the thin mother glass 1, the coating solution may be dried by using an infrared lamp, a hot air generator, a hot plate, or an oven, and a cluster-type or inline-type drier may be used.

Figure 4:
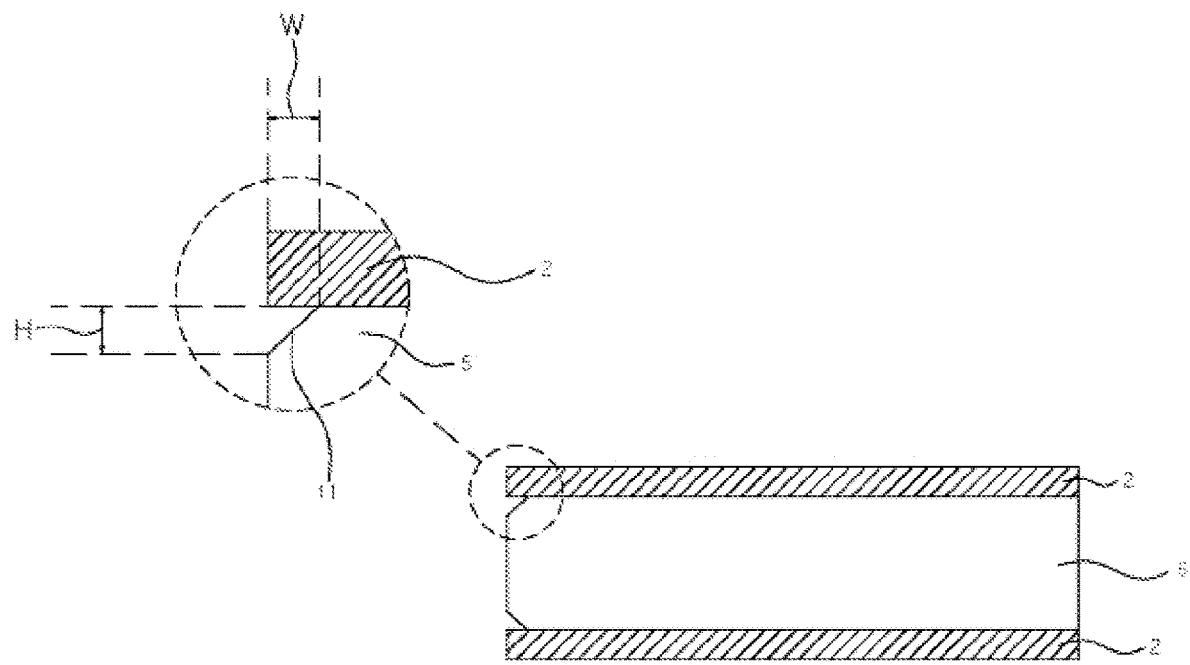
FIG. 4 is a drawing illustrating a bevel-shaped cut portion formed in a right-angled corner portion of thin-film glasses in cell units facing a coating film when cut thin-film glasses in cell units is healed in accordance with yet another exemplary embodiment.

In the step (S4) of healing a laser-cut surface of the thin-film glasses in cell units 5 through selective chemical treatment of the cut thin-film glasses in cell units 5 in order to eliminate a thermally-damaged area and a defective area generated during the laser cutting process around a cut surface of the thin-film glasses in cell units 5, in a right-angled corner portion of the thin-film glasses in cell units 5 facing the coating film 2, as illustrated in FIG. 4, a bevel-shaped cut portion 11 is formed due to a healing solution, wherein the bevel-shaped cut portion 11 has a horizontal width W of approximately 3 um to approximately 500 um, the bevel-shaped cut portion 11 has a height H of approximately 3 um or greater, and the bevel-shaped cut portion 11 has a thickness of no greater than approximately 50% of the thickness of the thin-film glasses in cell units 5.

The thin-film glasses in cell units 5 is dipped into a healing solution to be healed, wherein the healing solution contains ammonium difluoride, sulfuric acid, nitric acid, water, and an additive.

The additive is a surfactant used to improve healing performance, wherein the surfactant serves to increase the uniformity of healing by lowering surface tension.

The healing solution contains approximately 0.5 wt % to approximately 0.9 wt % of ammonium difluoride, approximately 3 wt % to approximately 15 wt % of sulfuric acid, approximately 1 wt % to approximately 10 wt % of nitric acid, approximately 80 wt % to approximately 90 wt % of water, and approximately 0.01 wt % to approximately 0.1 wt % of an additive. The surfactant may be a compound represented by Formula 1 below.

[Formula 1]

Here, $R_1$ is 4, 8, 12-triproplypentadecane, and A is triethanolamine.

In the step (S5) of ablating all of a coating film 2 formed on a surface of the thin-film glasses in cell units 5, the thin-film glasses in cell units 5 coated with the coating film 2 is immersed and melt in a solution for ablating a coating film to ablate the coating film 2.

The solution for ablating a coating film is a basic aqueous solution using potassium hydroxide (KOH), wherein the temperature of the potassium hydroxide (KOH) is approximately equal to or higher than 25 degrees Celsius.

However, in order to ablate traces of the coating film 2 present on the surface of the thin-film glasses in cell units 1 due to the attachment of some of the coating film 2, an additional cleaning process may be performed after ablating the coating film 2.

At this time, a cleaning liquid used in the additional cleaning process includes a potassium hydroxide (KOH) or sodium hydroxide (NaOH) solution and pure deionized water to which a surfactant has been added, wherein the pH of the cleaning liquid is approximately 10 or higher.

In the step of reinforcing the surface-healed thin-film glasses in cell units 5, a reinforcing liquid used to reinforce the thin-film glasses in cell units 5 uses a potassium nitrate molten liquid.

The step of reinforcing the surface-healed thin-film glasses in cell units 5 includes pre-heating the thin-film glasses in cell units 5 in the range of approximately 200° C. to approximately 400° C., reinforcing the pre-heated thin-film glasses in cell units 5 by immersing the same in a reinforcing liquid maintained at approximately 370° C. to approximately 470° C., and discharging the thin-film glasses in cell units 5 from the reinforcing liquid and then slowly cooling the thin-film glasses in cell units 5 to room temperature.

The method for ablating a coating film, cutting glass, and performing post-treatment by using a laser according to the present invention, the method composed of the above-described processes, may reduce manufacturing costs of the thin-film glasses in cell units 5 by simplifying a manufacturing process in the manufacture of the thin-film glasses in cell units 5 applied to various electrical and electronic products.

In addition, the present invention may improve durability of processed thin-film glasses in cell units 5 by eliminating, through selective chemical treatment, a thermally-damaged area around a glass cutting surface caused by a laser beam when cutting glass and a coating film by using a laser.

The invention claimed is:

1. A method for ablating a coating film, cutting glass, and performing post-treatment by using a laser, the method comprising:
   (S1) coating one side or both sides of a mother glass (1) having a thickness of approximately 100 μm or less with a coating solution to prevent chemical contact during selective chemical treatment;
   (S2) drying the coating solution to form the coating film (2) on one side or both sides of the mother glass (1);
   (S3) irradiating the coating film (2) with an ablating laser beam to partially ablate the coating film (2), and irradiating a surface of the mother glass (1) exposed through the ablated portion (A) of the coating film (2) with a cutting laser beam to cut the mother glass (1), thereby obtaining thin-film glasses in cell units (5), each having a thickness of approximately 100 μm or less and suitable for use in electrical and electronic products;
   (S4) chemically treating a laser-cut surface of the cell unit glasses (5) to eliminate a thermally-damaged area or other defective area generated during the laser cutting process, thereby forming a bevel-shaped cut portion (11) at a right-angled corner of the cell unit glasses (5) facing the coating film (2),
   wherein the bevel-shaped cut portion (11) has a horizontal width (W) of approximately 3 μm to approximately 500 μm, a height (H) of approximately 3 μm or greater, and a thickness of no greater than approximately 50% of the thickness of the thin-film glasses in cell units (5);
   (S5) ablating a remainder of the coating film (2) formed on a surface of the cell unit glasses (5); and
   (S6) chemically treating the surface of the cell unit glasses (5) from which the coating film (2) has been ablated to eliminate defects or flaws on the surface of the cell unit glasses (5),
   wherein:
   the ablating laser beam is an ultraviolet laser (4) and the cutting laser beam is an infrared laser (3);
   the infrared laser (3) outputs a Bessel beam
   having a wavelength of approximately 1020-1040 nm and a beam size of approximately 0.8-1.8 μm, and is selected from a nanosecond, picosecond, or femtosecond infrared laser;

the ultraviolet laser (4) is a femtosecond ultraviolet laser equipped with a scanner, the ultraviolet laser (4) having a wavelength of approximately 250-360 nm, a beam size of approximately 5-50 μm, and an overlap rate of approximately 10-99%; and the coating solution comprises either (i) an acrylic solution, or (ii) a resin solution selected from polyethylene, polypropylene, polyvinyl chloride, and polystyrene, the resin solution having an ultraviolet absorption rate of approximately 10% or greater at a wavelength of 400 nm or less and an infrared absorption rate of approximately 1% or less at a wavelength of 1000 nm or greater.

* * * * *